(12) United States Patent
Rogg

(10) Patent No.: US 11,285,843 B2
(45) Date of Patent: Mar. 29, 2022

(54) FRAME OF A SEAT ARRANGEMENT OF A VEHICLE

(71) Applicant: Aguti Produktentwicklung & Design GmbH, Langenargen (DE)

(72) Inventor: Christian Rogg, Wasserburg (DE)

(73) Assignee: Aguti Produktentwicklung & Design GmbH, Langenargen (DE)

( * ) Notice: Subject to any disclaimer, the term of this patent is extended or adjusted under 35 U.S.C. 154(b) by 73 days.

(21) Appl. No.: 16/660,927

(22) Filed: Oct. 23, 2019

(65) Prior Publication Data

US 2020/0130536 A1    Apr. 30, 2020

(30) Foreign Application Priority Data

Oct. 24, 2018    (DE) .................... 10 2018 126 482.8

(51) Int. Cl.
    *B60N 2/015*    (2006.01)

(52) U.S. Cl.
    CPC ..... *B60N 2/01558* (2013.01); *B60N 2/01508* (2013.01)

(58) Field of Classification Search
    CPC ............ B60N 2/01508; B60N 2/01558; B60N 2/01575; B60N 2/68
    USPC ..................................................... 296/65.03
See application file for complete search history.

(56) References Cited

U.S. PATENT DOCUMENTS

| | | | | |
|---|---|---|---|---|
| 3,986,459 | A * | 10/1976 | Riley | B60N 2/0715 105/345 |
| 4,114,947 | A | 9/1978 | Nelson | |
| 9,284,056 | B2 * | 3/2016 | Mejuhas | B64D 11/0696 |
| 2012/0235011 | A1 * | 9/2012 | Roy | B64D 11/0696 248/503.1 |
| 2014/0271021 | A1 * | 9/2014 | Cardona | B60N 2/01558 410/104 |
| 2018/0134394 | A1 * | 5/2018 | Weifenbach | B60N 2/01558 |

(Continued)

FOREIGN PATENT DOCUMENTS

| | | |
|---|---|---|
| DE | 196 28 382 A1 | 1/1988 |
| DE | 199 13 404 A1 | 9/2000 |

(Continued)

OTHER PUBLICATIONS

Extended European Search Report (Application No. 19203455.1) dated Mar. 18, 2020.

(Continued)

Primary Examiner — Jason S Morrow
(74) Attorney, Agent, or Firm — Burr & Brown, PLLC

(57) ABSTRACT

A frame of a seat arrangement of a vehicle having a base frame and a connecting mechanism for releasable connection of the base frame to a vehicle floor. The connecting mechanism includes a floor rail assigned to the vehicle floor and a connecting portion which is adapted to the floor rail and assigned to the base frame. In the connected state, a bearing face of the connecting portion bears against a bearing face of the floor rail. Two plug elements including a shank portion and a head portion of greater diameter relative to the shank portion, are provided on one bearing face, and two recesses formed as an undercut region adapted to the plug elements, are provided on the other bearing face, so that the connection is able to be produced by a rear-engagement connection between the plug elements and the associated recesses.

15 Claims, 2 Drawing Sheets

(56) References Cited

U.S. PATENT DOCUMENTS

2019/0300178 A1* 10/2019 Chadwell ........... B60N 2/01558
2020/0180769 A1* 6/2020 Doughty ............ B60N 2/01575

FOREIGN PATENT DOCUMENTS

| DE | 10 2005 023 007 B3 | 1/2007 |
| DE | 10 2014 003 966 A1 | 9/2015 |
| WO | 97/17223 A1 | 5/1997 |

OTHER PUBLICATIONS

German Search Report (Application No. 10 2018 126 482.8) dated Jul. 9, 2019.

* cited by examiner

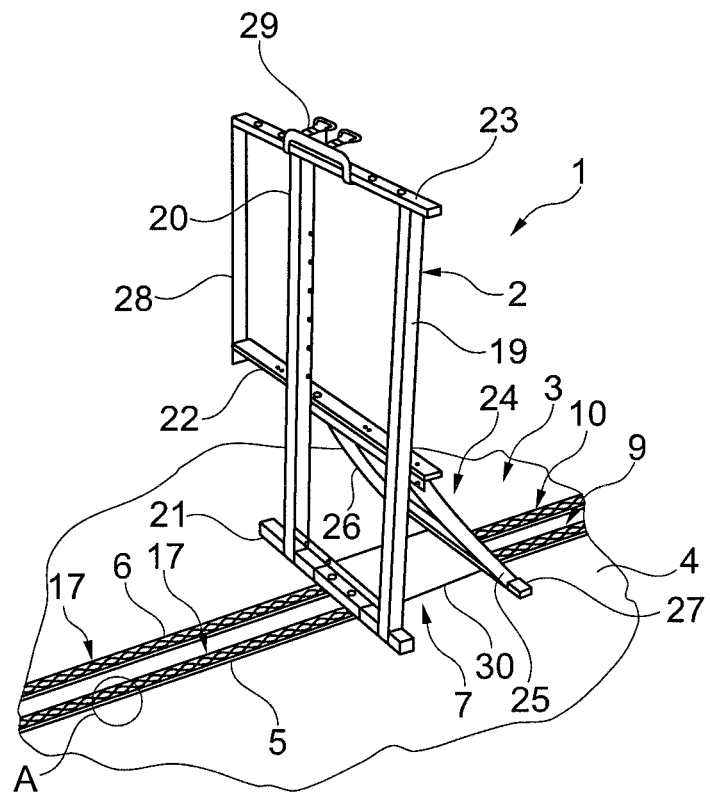
Fig. 1
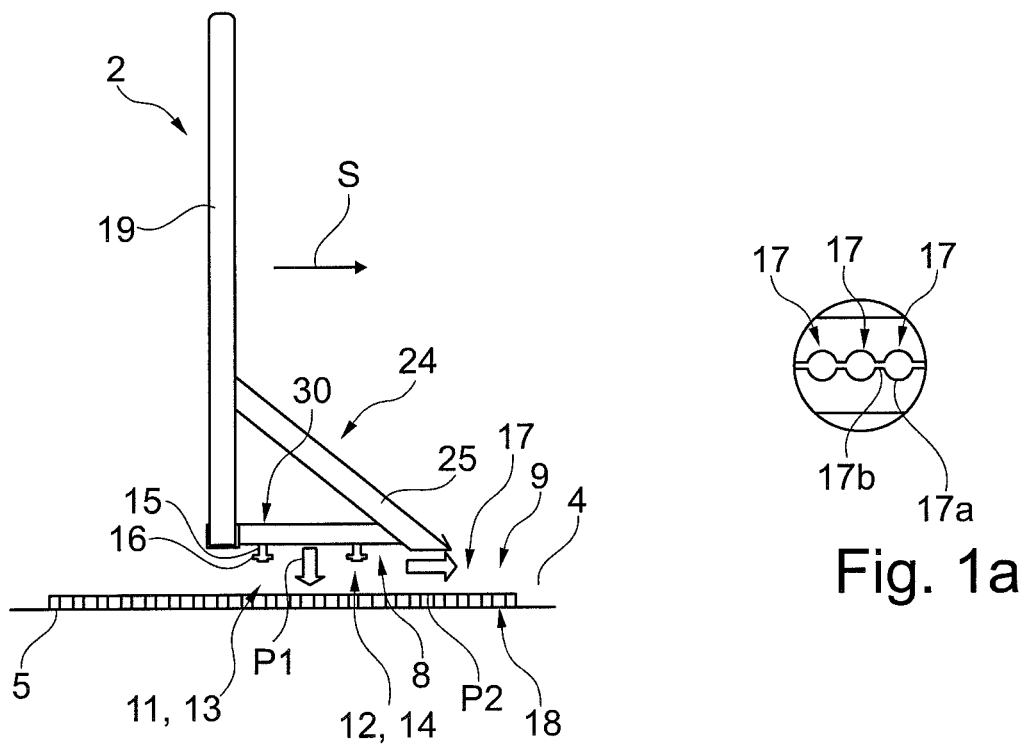
Fig. 2
Fig. 1a

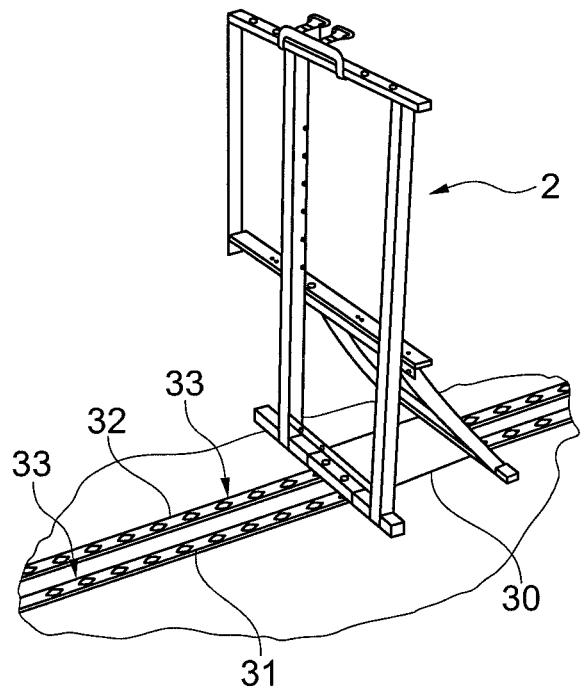
Fig. 3
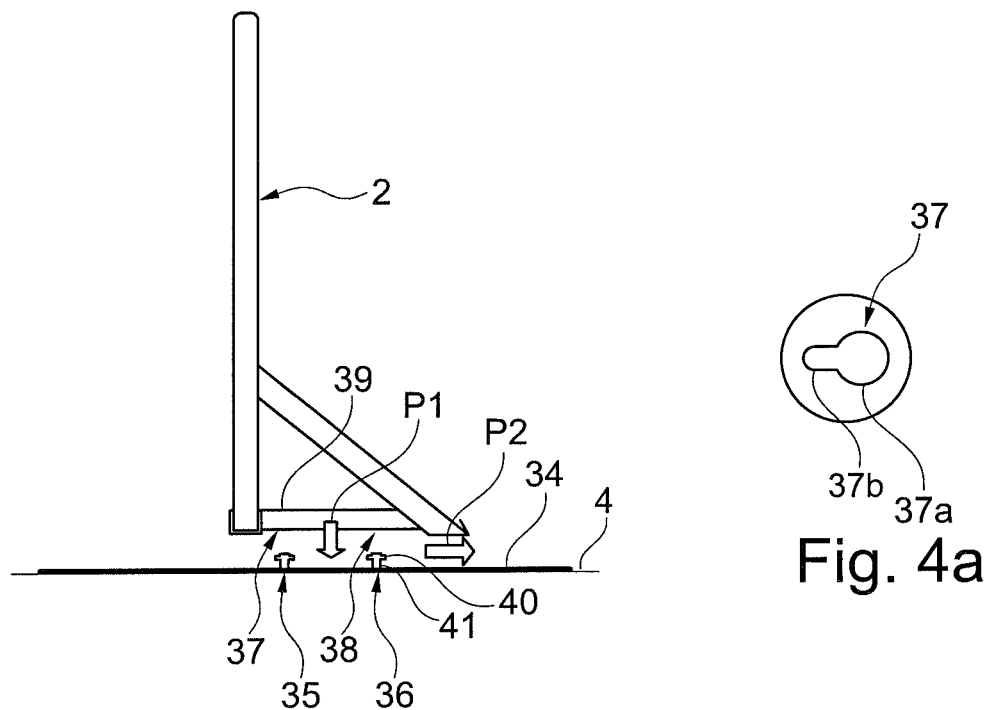
Fig. 4
Fig. 4a

FRAME OF A SEAT ARRANGEMENT OF A VEHICLE

This application claims the benefit under 35 USC § 119(a)-(d) of German Application No. 10 2018 126 482.8 filed Oct. 24, 2018, the entirety of which is incorporated herein by reference.

FIELD OF THE INVENTION

The present invention relates to a frame of a seat arrangement of a vehicle.

BACKGROUND OF THE INVENTION

For providing vehicles with internal equipment which is received on a vehicle floor of the vehicle, such as for example a floor panel of a motor vehicle, various solutions are implemented. For seat arrangements, in particular, screw connections are used in order to screw a frame and/or base frame of the seat arrangement.

These systems are frequently associated with greater assembly effort and/or are not suitable for the uncomplicated and rapid positioning of the internal equipment in the vehicle at individually selected and/or different points in the vehicle.

SUMMARY OF THE INVENTION

It is the object of the present invention to improve the attachment of a seat arrangement in a vehicle, in particular, with regard to flexible positioning in the vehicle and a solution which is simple in terms of assembly.

The present invention is based on a frame of a seat arrangement of a vehicle, wherein the frame has a base frame and a connecting mechanism for the releasable connection of the base frame to a vehicle floor, wherein the connecting mechanism comprise a floor rail which may be assigned to the vehicle floor and a connecting portion which is adapted to the floor rail and which may be assigned to the base frame, wherein in the connected state a bearing face of the connecting portion bears against a bearing face of the floor rail. The floor rail is preferably configured as an elongated steel profile with a lower face for support on an upper face of the vehicle floor. An upper face of the floor rail, which opposes the lower face, at least partially comprises the preferably planar bearing face. The connecting portion has an at least partially planar side and/or lower face, which in the connected state of the base frame and the vehicle floor faces the upper face of the floor rail and is preferably in bearing contact with the upper face of the floor rail. The floor rail is able to be flexibly fastened to a predetermined mechanically stabilized region, such as, for example, a region reinforced by a strut element or to any point on the vehicle floor, for example, is able to be screwed or welded thereto. The connecting mechanism may comprise just one floor rail or may comprise a plurality of floor rails. In the case of a plurality of floor rails, the floor rails may be offset parallel to one another and/or provided spaced apart and/or aligned one behind the other in the longitudinal direction.

The essential idea of the present invention is that at least two plug elements of protruding design, comprising a shank portion and a head portion of greater diameter relative to the shank portion, are provided on one bearing face, and two or more recesses which comprise an undercut region and which are appropriately adapted to the plug elements are provided on the other bearing face, so that the connection is able to be produced by a rear-engagement connection between the plug elements and the associated recesses, wherein when the rear-engagement connection is implemented the plug elements engage in the recesses and the head portion engages to the rear of the undercut region.

The preferably two plug elements are configured on the bearing face, such that these plug elements protrude relative to the other bearing face, i.e. protrude outwardly. The other bearing face preferably covers a cavity of the floor rail. The cavity contributes to the formation of the undercut and/or the rear-engagement connection, together with a wall of the floor rail defining the cavity and comprising the recesses. The outer face of the wall also forms the bearing face of the floor rail. The cavity which is provided to the rear of the bearing face is configured to receive at least partially the plug elements in the connected state. Preferably, the plug elements fully penetrate the cavity in the connected state. The two protruding plug elements are preferably designed identically.

In the connected state with the rear-engagement connection, advantageously the base frame is prevented from lifting away in the normal direction relative to the bearing surface of the floor rail by the rear-engaging head portion. At the same time, the undercut region and/or the wall of the bearing face acts as a mechanical stop for the head portion. The undercut region preferably comprises a cavity which is covered by a wall forming the bearing face and/or which is provided by an interior of a hollow portion of the bearing face. The recesses and/or openings are provided in the wall of the bearing face which covers the cavity, the recesses and/or openings, for example, being stamped out or laser cut.

The plug elements and the recesses are designed, in particular, such that the connected state is able to be implemented by plugging and pushing movements of the base frame carried out successively relative to the floor rail, which is simple in terms of assembly. A fitter only has to bring the plug elements and the recesses together in the appropriate manner so that the plug elements are brought opposite respectively associated recesses and are able to penetrate and/or be engaged therein. Then the base frame is moved in the direction of penetration and/or engagement, wherein the plug elements penetrate and/or engage in the recesses. This is carried out to a sufficient extent until the bearing faces are preferably brought into mutual contact. Then the base frame is displaced relative to the floor rail as far as a stop position, so that the connected state is reached. The displacement takes place in a guided manner since the bearing faces are mutually supported and serve as slide surfaces. The displacement is preferably carried out over a relatively short displacement path of, for example, a few millimeters and/or a few centimeters in the longitudinal direction of the floor rail. The displacement is possible since the head portion constitutes a relatively short and/or limited axial length of the plug element and is received in the continuously open cavity and the shank portion is displaceable in the narrower opening portion of the recess.

By means of the present invention, a variable and practical positioning of the base frame in the longitudinal direction of the floor rails is possible in the interior of the vehicle and/or is able to be implemented in the respectively desired position of the seat arrangement in the interior of the vehicle.

Advantageously, the connecting portion comprises an adapter element which may be assigned to the base frame, in particular, is able to be arranged on the base frame. Thus the base frame may be configured optionally and/or flexibly for the connection according to the present invention. Existing base frames may be retrospectively provided with an adapter element, so that the present invention is advantageous. Thus only one or more floor rails have to be fastened to the vehicle floor. The adapter element, in particular, is securely fixed and/or attached in a positionally secure manner to the base frame. Either the recesses or the plug elements are configured on the adapter element. Thus either the plug elements or the recesses are provided on the floor rail in a complementary manner thereto.

It is also advantageous if a recess comprises an opening on the bearing face, wherein the opening has a first opening portion and a second opening portion adjoining the first opening portion, wherein the first opening portion has a greater degree of opening than the second opening portion. The contour of the recess is, for example, adapted and/or approximated to the contour of a key hole for a bit key. Alternatively, the contour may have a different alternating shape, with alternately a larger and smaller degree of opening, for example, in the manner of a rectangular tooth profile.

The degree of opening of the first and/or larger opening portion is designed for an appropriate engagement of the head portion of an associated plug element, wherein an external dimension of the head portion is only slightly smaller than an external dimension of the first opening portion. The degree of opening of the second and/or narrower opening portion is designed for an appropriate engagement of the shank portion, wherein an external dimension of the shank portion is only slightly smaller than an external dimension of the second opening portion.

If, during assembly, the base frame is moved transversely to the longitudinal direction of the floor rail toward the floor rail into the correct position, wherein the longitudinal axis of the plug elements and the center of the first opening portion are aligned, the head portion of the plug element penetrates the first opening portion with a small spacing from the edge of the first opening portion. The head portion is moved past the edge of the first opening portion into the cavity to the rear of the bearing face. This movement is limited if the bearing face of the connecting portion on the base frame and the bearing face of the floor rail mutually bear against one another. Then the base frame is moved relative to the floor rail in the longitudinal direction of the floor rail and/or bearing face is displaced on bearing face, such that the shank portion is pushed into the second opening portion. The head portion enters the region to the rear of the second opening portion which constitutes the rear-engagement connection.

At the same time, the larger head portion engages to the rear of the narrower edge of the second opening portion. Since at least two and/or just two plug elements or two pairs with two respective plug elements are provided, the connection is carried out via both plug elements simultaneously and/or identically as outlined above. When the end position of the fully positioned base frame is reached, this is able to be felt and/or heard by the fitter since then the shank portion strikes against an end of the second opening portion, which is remote from the first opening portion.

Then the base frame is not displaceable further in this direction on the floor rail. If the plug elements are assigned and/or belong to the base frame, the floor rail on its upper face has a plurality of recesses which are the same and/or identical and which are preferably arranged at regular intervals, preferably with in each case the same spacing between two adjacent recesses. The spacing between the adjacent recesses is appropriately adapted to the spacing between the two plug elements so that during assembly the two plug elements are able to penetrate the associated recesses.

According to an advantageous variant, the plurality of recesses are connected together. This means that a continuously elongated opening is provided on the associated bearing face, preferably on an upper face of the floor rail, the continuously elongated opening being formed from interconnected recesses. The elongated opening has a regular shape with alternating wider opening portions and narrower opening portions and/or with alternating first and second opening portions. The wider opening portions permit the appropriate engagement of the head portion of a plug element and the narrower opening portions permit the appropriate engagement of the shank portion of a plug element, in each case with low clearance and/or a small gap spacing. The plurality of connected recesses accordingly have a continuous opening contour, for example, an opening contour in the manner of a chain of pearls.

According to an alternative of the present invention, the plurality of recesses are not connected together, wherein each individual recess has a first opening portion and a second opening portion adjoining the first opening portion, wherein the two opening portions are connected together so as to be open and/or transition into one another. The two opening portions differ in terms of opening width and/or have a first opening portion of greater diameter and a second opening portion of smaller diameter. Accordingly, in each case, the plurality of preferably identical recesses are separated from one another by a web of the wall portion of the bearing face and/or in each case an adjacent recess is provided on both sides of each recess and/or in front of and to the rear of the relevant recess, apart from a first recess and a last recess. The plurality of recesses are preferably all spatially oriented in an identical manner in succession in a line on the bearing face. An advantage is achieved if on the floor rail a plurality of identically designed recesses are provided in succession along the length of the floor rail. Preferably more than three, in particular, more than four, for example, up to twenty or more, recesses are provided on a floor rail and/or, for example, per meter of the floor rail.

In the variant, according to which the recesses are provided in the floor rail, the recesses are designed along the length and/or in the longitudinal direction of the floor rail on the upper face thereof. The recesses are preferably positioned centrally on the bearing face and/or on the upper face of the floor rail relative to the width of the upper face. Preferably, an elongated narrow hollow profile serves as a basis of the floor rail, such as a steel rail with, for example, a rectangular hollow cross section. The recesses are provided on at least a flat planar side of the hollow profile rail and/or the upper face which is formed by a wall of the hollow profile. The floor rail is positioned with the lower face on the vehicle floor opposing the upper face, and is fastened thereto.

It is also advantageous if the plug elements are provided in a rigid and immovable manner on the bearing face. This permits a secure and/or mechanically high load-bearing fixing of the base frame to the floor rail. The plug elements preferably also consist of a steel material and are securely connected to the bearing face, for example, welded or screwed thereto.

An advantageous modification of the present invention is characterized in that the floor rail is formed as flat material, the plug elements being configured on the upper face thereof. Thus, the base frame may be attached to the vehicle floor so as to be of very flat construction in relative terms. The recesses are then provided on the base frame and/or the adapter element. It is also advantageous if the adapter element comprises two first plug elements which are positioned spaced apart from one another on a first straight line and two second plug elements which are positioned spaced apart from one another on a second straight line, wherein the first and the second line are oriented parallel to one another. The lines are preferably oriented transversely to a width direction of the frame and/or parallel to and/or in the seating direction of the seat arrangement which may be provided by the frame. Thus the base frame may be fastened to the vehicle floor in a stable and tilt-free manner.

A particularly stable connection is able to be implemented by the two-row arrangement of the plug elements. In the case of the two-row arrangement of the plug elements on the adapter element, it is advantageous if the connecting mechanism comprise just two separate floor rails.

Alternatively, it is not excluded to provide a relatively wider single floor rail with two rows of recesses which are appropriate for the plug elements. The plug elements and the recesses are configured for the appropriate engagement and/or cooperation of all four plug elements with four recesses. Preferably, all plug elements are configured identically and with the same spacing from one another on the respective line. Accordingly, the spacings of the plug elements of the first line are identical to the spacings of the plug elements on the second line. Preferably, the plug elements of the first line are aligned laterally with the respectively adjacent plug element of the other line.

In the case of a two-row arrangement, with in each case two plug elements located on one line, it is preferred that the two plug elements of one line engage in two recesses of a first floor rail and the two further plug elements of the other line engage in two recesses of a second floor rail. Instead of the two-row arrangement of the plug elements on the adapter element, a single-row arrangement is possible with a plurality of, and/or preferably just two, plug elements in succession in a line. Then just one floor rail is required as a counterpart of the connecting mechanism. This is advantageous economically and with regard to a lower overall weight.

Alternatively, if an adapter element is intended to be dispensed with, for arranging the plug elements on the adapter element the plug elements may also be provided to protrude directly, for example, from a lower face of a portion of the base frame, such as, for example, a longitudinal and/or transverse strut of the base frame which is provided on the lower face of the base frame.

An advantage of the adapter element is that existing frames comprising a base frame may optionally be retrospectively fitted to form a frame according to the present invention in a simple and flexible manner.

According to an advantageous modification of the present invention, the adapter element is configured as a component which is arranged between a floor-transverse strut of the base frame and a lower end region of a support foot arrangement of the base frame. By means of the adapter element, an end region of the base frame located therebelow is appropriately configured for attaching the base frame to the floor rail.

In this case, it is advantageous if the adapter element is configured such that it is able to be appropriately attached to base frames of various designs.

For example, a support foot arrangement may be provided on the base frame, advantageously forces and torques being able to be absorbed thereby. The support foot arrangement may have just one support foot strut or may have a plurality thereof, for example, two elongated and/or profile-shaped support foot struts in the installed state of the frame in the vehicle, for example, and/or preferably inclined in a linear and oblique manner relative to the vertical, for example, inclined by ca. 45 angular degrees relative to the vertical. The support foot struts act with their upper end on a horizontal transverse strut of the base frame, for example, by being securely fixed thereto, wherein the transverse strut is provided as a seat surface-transverse strut in the region of a seat surface of the seat arrangement which is able to be formed with the frame. The action of the support foot struts is implemented, for example, in the region between two vertical supports of the base frame connected to the transverse strut. The support foot struts preferably extend from the transverse strut obliquely to the front in the seating direction of the seat arrangement, so that a lower end of the support foot struts is offset to the front, vertically level with the lower end of the vertical supports of the base frame.

The base frame is supported on the vehicle floor by the lower end of the support foot struts, in addition to the support by the lower end of the vertical supports and/or by a transverse element, such as a foot-transverse strut, which is generally provided between the lower ends of the vertical supports. When under load, such as, for example, in the case of a rear-end collision of the vehicle, in particular, compressive forces, but also pulling forces, between the base frame and the vehicle floor are transmitted via the connection to the floor rails. The support foot arrangement acts on the base frame in a mechanically stabilizing manner and/or, for example, acts in the seating direction of the relevant seat arrangement in a tiltproof manner.

The adapter element is preferably configured such that it is able to be securely connected to a portion on the foot transverse strut and/or is fixed thereto and is able to be securely connected and/or is fixed to a portion on the lower end of the one or more and/or both support foot struts or to a transverse element which is provided transversely between the lower ends of the plurality of, for example, the two, support foot struts. The adapter element may preferably be appropriately designed for a universal attachment to different base frame types, in particular, irrespective of whether the support foot arrangement comprises just one support foot strut or a plurality of support foot struts. Alternatively, for each base frame type an adapter element which is adapted thereto may be used. When the adapter element is attached, for example, this forms a stabilizing floor panel of the base frame.

Accordingly, the adapter element is preferably configured as a flat component with planar contact faces, in particular, configured in a plateshaped and/or strip-shaped manner. The adapter element is, for example, a square plate or strip-shaped.

A further advantage results if fixing mechanisms are provided for fixing the base frame to the floor rail when the rear-engagement connection is implemented, wherein a displacement of the base frame in the longitudinal direction of the floor rail in at least one displacement direction is prevented by the fixing means.

The fixing mechanisms preferably serve for the releasable but secure fixing of the assembled base frame against a displacement in the longitudinal direction of the floor rail, when the base frame adopts the desired assembled position. The fixing mechanisms may comprise automatically locating latching means or, for example, set screws acting between the base frame and the floor rail.

According to an advantageous variant of the present invention, two first recesses which are positioned spaced apart from one another on a first line and two second recesses which are positioned spaced apart from one another on a second line are provided on the adapter element, wherein the first and the second line are oriented parallel to one another. This variant is configured for a connection of the base frame to two floor rails which may be attached to the vehicle floor.

In each case, at least two upwardly protruding plug elements are provided on the two base rails, said plug elements being appropriately adapted to the recesses on the adapter element. Alternatively, just one floor rail may be provided with at least two upwardly protruding plug elements, which are provided offset to one another in a line, and an adapter element on the base frame, wherein the adapter element has just two recesses in a line in succession, for appropriate cooperation with the at least two plug elements.

Advantageously, the connecting mechanisms comprise two floor rails which are oriented parallel to one another. Two parallel floor rails which are able to be arranged in the vehicle on the vehicle floor, parallel to the direction of travel of the vehicle, is advantageous for a stable attachment of the base frame in the vehicle.

Alternatively, the connecting mechanisms comprise just one floor rail. This saves material and weight and is advantageous with regard to a simple and rapid assembly.

The present invention further relates to a seat arrangement of a vehicle comprising a frame which is designed according to one of the above-described embodiments.

The seat arrangement may be configured as a single vehicle seat or as a seat bench for providing two or more seat places. Then the frame is correspondingly designed and/or has a greater width and/or a plurality of vertical supports and, for example, wider transverse struts and/or a corresponding support foot arrangement.

Finally, the present invention also relates to a vehicle comprising a seat arrangement which has a frame according to one of the above-described embodiments. The vehicle is, for example, a motorhome, a campervan, or a utility vehicle or the like.

BRIEF DESCRIPTION OF THE DRAWINGS

Further features and advantages of the present invention are described in more detail with reference to the various embodiments of the present invention shown schematically in the figures.

FIG. 1 shows a first embodiment of a frame according to the present invention in a perspective view obliquely from above with partially shown floor rails;

FIG. 1a shows the region A edged in FIG. 1 enlarged and vertically from above;

FIG. 2 shows the arrangement according to FIG. 1 in an assembly step, wherein the arrangement relative to FIG. 1 is shown simplified from the side with the floor rail shown in section, in an assembly state with a base frame spaced apart from the floor rails;

FIG. 3 shows a second embodiment of a frame according to the present invention in a perspective view obliquely from above with partially shown floor rails;

FIG. 4 shows a further embodiment of a frame according to the present invention with a partially shown floor rail, wherein the arrangement is shown simplified from the side in an assembly state with a base frame spaced apart from the floor rail; and FIG. 4a shows a circular edged region of a lower face of the base frame according to FIG. 4, viewed vertically from below.

DETAILED DESCRIPTION OF THE INVENTION

The same reference numerals are used in some cases for corresponding elements of the various exemplary embodiments shown in the figures.

FIG. 1 shows a frame 1 according to the present invention which is configured for forming a seat arrangement in a vehicle, for example, for a single or multiple seat arrangement. To this end, further elements of the seat arrangement, not shown further in the figures, have to be attached to the frame 1, such as, for example, cushion elements and further components of a belt restraint system and/or a seat belt arrangement.

The frame 1 comprises as a main component a base frame 2 and connecting means 3 for the releasable connection of the base frame 2 to a vehicle floor 4 which is oriented horizontally in the interior of a relevant vehicle.

The connecting mechanism 3 have a connecting portion 7 on the base frame 2 and two identical floor rails 5 and 6, which may be assigned to the vehicle floor 4, shown by way of indication, such as, for example, a floor panel of the vehicle, not shown further, and/or may be attached thereto.

The floor rails 5, 6 are preferably formed in each case as a hollow profile with a planar upper face and a planar lower face, for example, as a square hollow profile. The base frame 2 is assembled from a plurality of preferably linear profile elements and, in the exemplary embodiments shown, comprises two perpendicular vertical supports 19, 20 in the use state and/or installed state, and transverse struts 21 to 23 which are horizontal and/or which are oriented transversely to the vertical supports 19, 20. The transverse struts comprise a lower transverse strut 21, a central transverse strut 22 and an upper transverse strut 23.

Moreover, a support foot arrangement 24 is provided, the support foot arrangement acting on the central transverse strut 22 and extending to the front obliquely relative to the vertical as far as the floor rails 5, 6 in a seating direction S of the seat arrangement. The support foot arrangement 24 comprises two linear, obliquely oriented struts 25, 26 and a support foot arrangement-transverse strut 27 which is supported so as to bear against the floor rails 5, 6.

Moreover, a connecting piece 28 which is parallel to the vertical supports 19, 20 is provided, the connecting piece connecting together the ends of the central transverse strut 22 on the front face and the upper transverse strut 23 on a side of the base frame 2 belonging to the vertical support 19.

Moreover, a component 29 of a belt restraint system which is able to be attached to the frame 1 is securely fixed to the upper transverse strut 23, approximately centrally between the two vertical supports 19 and 20.

Moreover, a flat and/or plate-like rigid adapter element 30 is provided so as to be securely attached between the lower transverse strut 21 and the support foot arrangement-transverse strut 27.

In the connected state of the frame 1 and the vehicle floor 4 a bearing face 8 of the connecting portion 7, which is provided on the lower face of the base frame 2, and/or of the adapter element 30, bears against a bearing face 9 and/or 10 of the respective floor rail 5, 6. The bearing faces 9 and/or 10 form, for example, in each case, an upper face of the relevant floor rail 5 and/or 6. A total of four identically designed plug elements 11, 12, 13, and 14 are provided on the planar underside bearing face 8 of the adapter element 30 so as to protrude vertically therefrom, wherein the two plug elements 11 and 12 are provided spaced apart from one another on a first line and the two plug elements 13 and 14 are provided spaced apart from one another in a line parallel to the first line.

In the side view according to FIG. 2, the plug elements 11 and 13 are aligned laterally and/or transversely to the drawing plane as are also the two plug elements 12 and 14. Each plug element 11-14 has an elongated narrow shank portion 15 and a head portion 16 which is greater in diameter relative to the shank portion 15. A plurality of recesses 17 which are appropriately adapted to the plug elements 11-14 are provided on the respective bearing faces 9, 10 of the floor rails 5, 6 and/or on the upper faces thereof, comprising in each case an internal and/or hollow undercut region 18 which is covered outwardly. The recesses 17 are provided at regular intervals in succession in the longitudinal direction of the floor rails 5, 6, wherein the recesses 17 in each case have a wider opening portion 17a and a narrower opening portion 17b adjacent thereto, wherein the wider opening portion 17a and the narrower opening portion 17b are provided so as to follow one another in turn and/or alternately (see FIG. 1a). The undercut region 18 is formed in the interior of the floor rails 5, 6 in the region of the narrower opening portion 17b. The two plug elements 11 and 12 are configured to engage in two recesses 17 of the floor rail 5 and the two plug elements 13 and 14 are configured to engage in two recesses 17 of the floor rail 6.

The connection of the base frame 2 to the floor rails 5, 6 and thus to the vehicle floor 4 takes place by a stepwise assembly.

In the first assembly step, as shown in FIG. 2, the base frame 2 which is oriented upright, is guided according to the movement arrow P1 in FIG. 2 with its bearing face 8 in the direction of the bearing faces 9 and 10 of the respective floor rail 5, 6 so that the respective head portion 16 of the four plug elements 11-14 appropriately engages through an appropriately wider opening portion 17a of one respective recess 17. In this case, each head portion 16 respectively moves with low clearance past an edge of the respective wider opening portion 17a. The respective head portion 16 of the plug elements 11-14 is inserted sufficiently far in the direction P1 into the interior of the hollow floor rails 5, 6 until the bearing face 8 of the adapter element 7 on the lower face on the base frame 2 is located on a counter portion and/or on the bearing face 9 and/or 10 of the two floor rails 5 and/or 6.

In the second assembly step, the base frame 2 is now displaced relative to the positionally secure floor rails 5, 6 in the longitudinal direction thereof according to the movement arrow P2. In the direction P2, the base frame 2 is displaced sufficiently far until the head portions 16 in each case adopt a rear-engagement position below an associated narrower opening portion 17b. The shank portion 15 of the plug elements 11-14 is sufficiently long that the head portions 16 are able to be guided below the wall of the upper face of the floor rails 5, 6. In the displaced state after the second assembly step and/or after the final assembled position has been reached, the base frame 2 is not able to be lifted upwardly counter to the direction P1 from the floor rails 5, 6 due to the head portions 16 which have a larger diameter relative to the narrower opening portions 17b. In this rear-engagement position the base frame 2 only has to be fixed counter to a movement in the longitudinal direction of the floor rails and/or in the direction P2 and counter to the direction P2 which, for example, is possible by a screw connection using screw elements or by latching using latching elements. Alternatively, the attachment is possible in a corresponding manner if the frame according to the present invention has just one floor rail with a plurality of recesses and the adapter element has just two plug elements in succession in a line. The adapter element may thus be slightly narrower than the adapter element 7 shown in FIG. 1.

The above-described possibilities for attachment to one or two floor rails may also be implemented if the support foot arrangement 24 has just one oblique strut which may be configured with or without a support foot arrangement-transverse strut. In principle, it is not excluded, for example, to omit the adapter element 7 and/or to provide the plug elements 11-14 on a lower face of the lower transverse strut 21 and/or a lower face of the support foot arrangement-transverse strut 27 or the struts 25, 26 of the support foot arrangement 24. Common to all exemplary embodiments is the variable and flexible positioning of the base frame 2 in the longitudinal direction of the floor rails 5, 6 in the vehicle, depending on the respectively desired position of the seat arrangement inside the vehicle.

FIG. 3 shows a further advantageous variant which differs from the arrangement according to FIGS. 1 and 2 solely by a different recess pattern and/or hole pattern in the two floor rails 31 and 32 and/or by further recesses. Accordingly, recesses 33 which are separate from one another are provided in the two floor rails 31, 32, the recesses in each case having a key-hole shape with a wider opening portion and a narrower opening portion adjoining the wider opening portion so as to be open relative thereto. During assembly, after inserting the plug elements in the wider opening portion the displacement of the base frame 2 in the second assembly step is limited by the plug elements with the shank portion thereof striking against the edge of the narrower opening portion. If the base frame 2 is intended to be positioned at a different point along the floor rails 31, 32, the entire base frame 2 has to be completely separated from the floor rails 31, 32 by being pushed back and lifted away from the floor rails 31, 32. In contrast, in the variant according to FIGS. 1 and 2, the base frame 2 may remain on the floor rails 5, 6 in order to adopt a different position along the floor rails 5, 6. To this end, it is only necessary to release the fixing of the base frame 2 against a movement in the longitudinal direction of the floor rails 5, 6.

A further variant of a frame according to the present invention according to FIGS. 4 and 4a differs from the exemplary embodiments according to FIGS. 1 to 3 by the arrangement of the connecting means, which are configured in the same manner as in the exemplary embodiment according to FIG. 3 but transposed as regards the position on the base frame 2 and on a floor rail 34.

Accordingly, two plug elements 35, 36 are provided on an upper face of the floor rail 34 so as to protrude upwardly in a line, and two recesses 37 and 38 having a key-hole shape are provided in succession on a longitudinal line on a lower face of an adapter element 39. The recess 37 is shown in FIG. 4a enlarged in a detailed view perpendicular to the lower face of the adapter element 39. The spacing between the two plug elements 35, 36 corresponds to the spacing along the adapter element 39 between the two recesses 37 and 38.

In the first assembly step, the base frame 2 is positioned according to the movement arrow P1 in the direction of the floor rail 34 so that both head portions 40 of the plug elements 35, 36, which are round in plan view, engage through the respective wider opening portion 37a of the recesses 37, 38 with low clearance and/or with a small external round gap dimension. At the end of the movement of the base frame 2 in the direction P1 the lower face of the adapter element 37 is supported on an upper face of the floor rail 34.

In the second assembly step, the base frame 2 is displaced relative to the positionally secure floor rails 34 in the longitudinal direction according to the movement arrow P2, until a shank portion 41 of the respective plug elements 35, 36 which is narrower than the head portion 40 passes into a narrower opening portion 37b of the recesses 37, 38 and protrudes from the respective edge thereof. Now the base frame 2 has to be fixed to the floor rail 34, for example by screwing thereto. The attachment of the base frame may also be correspondingly implemented by means of two parallel floor rails which are designed according to the floor rail 34 and four plug elements which are designed according to the plug elements 35, 36. Thus instead of a two-point rear-engagement connection according to FIG. 4, a four-point rear-engagement connection is produced.

LIST OF REFERENCE NUMERALS

1 Frame
2 Base frame
3 Connecting mechanism
4 Vehicle floor
5 Floor rail
6 Floor rail
7 Connecting portion
8 Bearing face
9 Bearing face
10 Bearing face
11 Plug element
12 Plug element
13 Plug element
14 Plug element
15 Shank portion
16 Head portion
17 Recesses
17a Opening portion
17b Opening portion
18 Undercut region
19 Vertical support
20 Vertical support
21 Transverse strut
22 Transverse strut
23 Transverse strut
24 Support foot arrangement
25 Strut
26 Strut
27 Support foot arrangement-transverse strut
28 Connecting piece
29 Component
30 Adapter element
31 Floor rail
32 Floor rail
33 Recess
34 Floor rail
35 Plug element
36 Plug element
37 Recess
37a Opening portion
37b Opening portion
38 Recess
39 Adapter element
40 Head portion
41 Shank portion

The invention claimed is:

1. A frame of a seat arrangement of a vehicle, wherein the frame has a base frame and a connecting mechanism for the releasable connection of the base frame to a vehicle floor, wherein the connecting mechanism comprises a floor rail, which has an extending direction and outermost edges, that is assigned to the vehicle floor and a connecting portion that is adapted to the floor rail and is assigned to the base frame, wherein the base frame comprises two support elements, which extend in a vertical direction, a central transverse strut and a lower floor-transverse strut, which connect the support elements and extend in a direction perpendicular to the extending direction of the floor rail, such that the floor-transverse strut has a bearing surface that bears against and extends beyond the floor rail, with the central transverse strut connected to a support foot arrangement of the base frame that comprises at least one support strut that extends in a linear inclined direction from the central transverse strut to a support foot for arrangement-transverse strut, which extends in a direction perpendicular to the extending direction of the floor rail, such that the support foot for arrangement-transverse strut has a bearing surface that bears against and extends beyond the floor rail, with the connecting portion extending between the floor-transverse strut and the support foot for arrangement-transverse strut, wherein in the connected state a bearing face of the connecting portion bears against a bearing face of the floor rail, wherein at least two plug elements of protruding design, comprising a shank portion and a head portion of greater diameter relative to the shank portion, are provided on one bearing face, and two or more recesses, which comprise an undercut region and which are appropriately adapted to the plug elements, are provided on the other bearing face, so that the connection is able to be produced by a rear-engagement connection between the plug elements and the associated recesses, and wherein when the rear-engagement connection is implemented the plug elements engage in the recesses and the head portion engages to the rear of the undercut region.

2. The frame as claimed in claim 1, wherein the connecting portion comprises an adapter element that is assigned to the base frame.

3. The frame as claimed in claim 1, wherein a recess comprises an opening on the bearing face, wherein the opening has a first opening portion and a second opening portion adjoining the first opening portion, wherein the first opening portion has a greater degree of opening than the second opening portion.

4. The frame as claimed in claim 1, wherein a plurality of recesses are connected together.

5. The frame as claimed in claim 1, wherein on the floor rail a plurality of identically designed recesses are provided in succession along the length of the floor rail.

6. The frame as claimed in claim 1, wherein the plug elements are provided in a rigid and immovable manner on the bearing face.

7. The frame as claimed in claim 1, wherein the floor rail is formed as flat material, the plug elements being configured on the upper face thereof.

8. The frame as claimed in claim 2, wherein the adapter element comprises two first plug elements which are positioned spaced apart from one another on a first straight line and two second plug elements which are positioned spaced apart from one another on a second straight line, wherein the first and the second lines are oriented parallel to one another.

9. The frame as claimed in claim 2, wherein the adapter element is configured as a component which is arranged between a floor-transverse strut of the base frame and a lower end region of a support foot arrangement of the base frame.

10. The frame as claimed in claim 1, wherein fixing mechanisms are provided for fixing the base frame to the floor rail when the rear-engagement connection is implemented, wherein a displacement of the base frame in the longitudinal direction of the floor rail in at least one displacement direction is prevented by the fixing mechanism.

11. The frame as claimed in claim 1, wherein two first recesses which are positioned spaced apart from one another on a first line and two second recesses which are positioned spaced apart from one another on a second line are provided on an adapter element, wherein the first and the second line are oriented parallel to one another.

12. The frame as claimed in claim 1, wherein the connecting mechanism comprises two floor rails which are oriented parallel to one another.

13. The frame as claimed in claim 1, wherein the connecting mechanism comprises just one floor rail.

14. A seat arrangement of a vehicle comprising a frame as claimed in claim 1.

15. A vehicle comprising a seat arrangement as claimed in claim 14.

* * * * *